US012562560B2

(12) United States Patent
Sarraf et al.

(10) Patent No.: US 12,562,560 B2
(45) Date of Patent: Feb. 24, 2026

(54) VEHICLE CHARGING SYSTEM FOR AN ELECTRIC VEHICLE HAVING ARC DETECTION

(71) Applicant: TE Connectivity Solutions GmBH, Schaffhausen (CH)

(72) Inventors: David Bruce Sarraf, Elizabethtown, PA (US); Nathan Philip Myer, Lancaster, PA (US); Ladislaus Kehl, Ottobrunn (DE); Christopher R. Raybold, Middletown, PA (US); Ram Kishore Venkatesan, Walkertown, NC (US); Hunter C. Mitchell, Kernersville, NC (US)

(73) Assignee: TE Connectivity Solutions GmBH (CH)

( * ) Notice: Subject to any disclaimer, the term of this patent is extended or adjusted under 35 U.S.C. 154(b) by 621 days.

(21) Appl. No.: 18/155,823

(22) Filed: Jan. 18, 2023

(65) Prior Publication Data

US 2023/0231372 A1 Jul. 20, 2023

Related U.S. Application Data

(60) Provisional application No. 63/346,266, filed on May 26, 2022, provisional application No. 63/300,845, filed on Jan. 19, 2022.

(51) Int. Cl.
*H02H 1/00* (2006.01)
*B60L 53/10* (2019.01)
*B60L 53/16* (2019.01)
*H02J 7/00* (2006.01)

(52) U.S. Cl.
CPC ............ *H02H 1/0015* (2013.01); *B60L 53/11* (2019.02); *B60L 53/16* (2019.02); *H02J 7/0029* (2013.01)

(58) Field of Classification Search
CPC ....... H02H 1/0015; B60L 53/11; B60L 53/16; B60L 3/04; H02J 7/0029; Y02T 10/70; Y02T 10/7072; Y02T 90/14; B60Y 2200/91
USPC ......................................... 320/109
See application file for complete search history.

(56) References Cited

U.S. PATENT DOCUMENTS

| | | | |
|---|---|---|---|
| 2018/0034197 A1 | 2/2018 | Lyon et al. | |
| 2021/0387537 A1* | 12/2021 | Bech | B60L 53/16 |
| 2022/0063434 A1* | 3/2022 | King, Jr. | H02J 7/0031 |
| 2022/0224136 A1* | 7/2022 | Friedrich | H02J 7/0047 |

OTHER PUBLICATIONS

International Search Report from First Office Action, International Application No. PCT/US2023/011152 19JAN2023.

* cited by examiner

*Primary Examiner* — Paul Dinh

(57) ABSTRACT

A vehicle charging system includes a housing having a mating end for mating with a charging component for the electric vehicle. The vehicle charging system includes a DC charging terminal held in a cavity of the housing and having a mating end for mating with the charging component. The vehicle charging system includes a charging controller for controlling vehicle charging. The vehicle charging system includes an arc sensor in the internal cavity configured to detect an arc event at the mating end of the DC charging terminal. The arc sensor is operably coupled to the charging controller to control the vehicle charging when the arc event is detected.

21 Claims, 6 Drawing Sheets

VEHICLE CHARGING SYSTEM FOR AN ELECTRIC VEHICLE HAVING ARC DETECTION

CROSS REFERENCE TO RELATED APPLICATIONS

This application claims benefit to U.S. Provisional Application No. 63/300,845, filed 19 Jan. 2022, titled "Charging Inlet Arc Detection" and U.S. Provisional Application No. 63/346,266 filed 26 May 2022, titled "Charging Inlet Arc Detection Method, the subject matter of which are herein incorporated by reference in their entirety.

BACKGROUND OF THE INVENTION

The subject matter herein relates generally to vehicle charging systems.

Electric vehicles (EV) and hybrid electric vehicles (HEV) include battery systems for operating the vehicles. The battery systems are charged by a vehicle charging system. For example, a charging connector, which is coupled to a power source, is connected to a charging inlet assembly of the vehicle to charge the battery. Known vehicle charging systems are not without disadvantages. For instance, the temperature of the terminals increase during charging, which may lead to damage to the charging components. In some instances, arcing may occur between the charging components, which can damage the charging connector and the charging inlet assembly.

A need remains for an arc detection method for a vehicle charging system of an electric vehicle.

BRIEF DESCRIPTION OF THE INVENTION

In one embodiment, a vehicle charging system for an electric vehicle is provided and includes a housing having a mating end for mating with a charging component for the electric vehicle. The housing includes an internal cavity. The vehicle charging system includes a DC charging terminal held by the housing in the internal cavity. The DC charging terminal includes a mating end for mating with the charging component. The DC charging terminal is connected to a power cable. The vehicle charging system includes a charging controller for controlling vehicle charging along the DC charging terminal. The vehicle charging system includes an arc sensor in the internal cavity configured to detect an arc event at the mating end of the DC charging terminal. The arc sensor is operably coupled to the charging controller to control the vehicle charging when the arc event is detected.

In another embodiment, a vehicle charging system for an electric vehicle is provided and includes a housing having a mating end for mating with a charging component for the electric vehicle. The housing includes an internal cavity. The vehicle charging system includes DC charging terminals coupled to the housing. Each of the DC charging terminals include a mating end and a terminating end opposite the mating end. The mating end for mating with the charging component. The terminating end is connected to a power cable. The vehicle charging system includes a charging controller for controlling vehicle charging along the DC charging terminals. The vehicle charging system includes an arc sensor in the internal cavity configured to detect an arc event at the mating end of the DC charging terminal. The arc sensor includes an arc noise signature monitor monitoring an electrical circuit to detect an arc noise signature on the electrical circuit corresponding to the arc event. The arc sensor is operably coupled to the charging controller to control the vehicle charging when the arc event is detected.

In a further embodiment, a charging inlet assembly for an electric vehicle is provided and includes a housing extending between a front and a rear. The housing has a chamber at the rear. The housing has a power connector at the front for receiving a charging connector. The power connector includes terminal channels between the front and the rear. The charging inlet assembly includes DC charging terminals coupled to the housing. Each of the DC charging terminals include a mating pin and a terminating end opposite the mating pin. The mating pin is positioned in the corresponding terminal channel for mating with the charging connector. The terminating end positioned in the chamber at the rear of the housing. The charging inlet assembly includes a charging controller received in the chamber. The charging controller controlling vehicle charging along the DC charging terminals. The charging inlet assembly includes an arc sensor in the housing configured to detect an arc event occurring at the mating pin of the corresponding DC charging terminal. The arc sensor is operably coupled to the charging controller to control the vehicle charging when the arc event is detected.

DETAILED DESCRIPTION OF THE INVENTION

Figure 1:
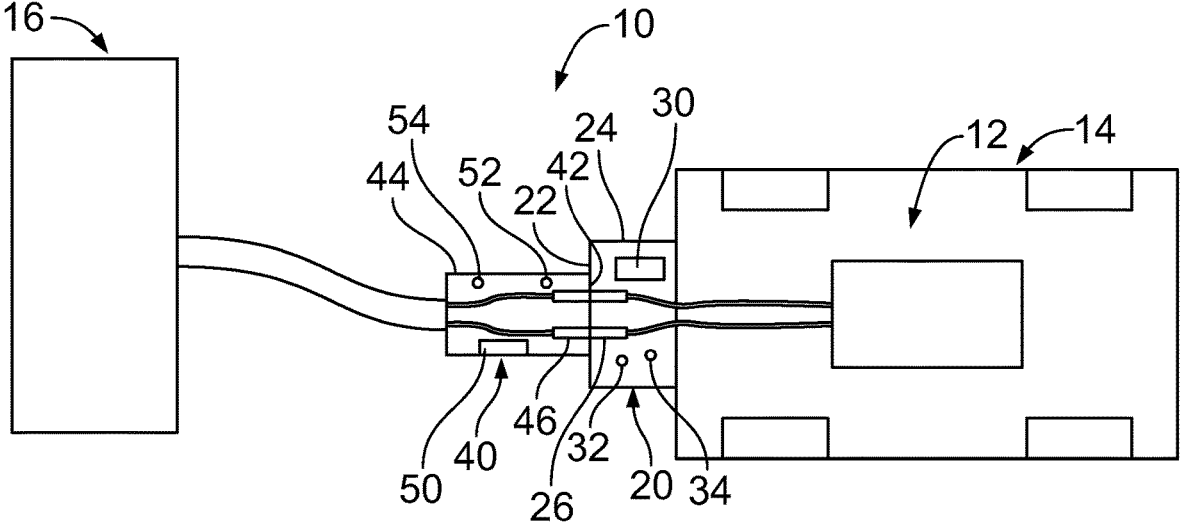
FIG. 1 is a schematic view of a vehicle charging system in accordance with an exemplary embodiment.

FIG. 1 is a schematic view of a vehicle charging system 10 in accordance with an exemplary embodiment. The vehicle charging system 10 is used for charging a battery system 12 of a vehicle 14, such as an electric vehicle or a hybrid electric vehicle. The vehicle charging system 10 includes a first charging component 20 and a second charging component 40. The first and second charging components 20, 40 are coupled together to charge the battery system 12 of the vehicle 14. In an exemplary embodiment, the first charging component 20 is coupled to the vehicle 14 and the second charging component 40 is coupled to a power supply 16 used for charging the battery system 12 of the vehicle 14. For example, the first charging component 20 may be a charging inlet assembly 22 mounted to the vehicle 14 and the second charging component 40 may be a charging connector 42 which may be provided at a charging station or coupled to the building wiring of the home or building where the vehicle 14 is parked.

The first charging component 20 includes a housing 24 holding a plurality of charging terminals 26. The charging terminals 26 may be DC charging terminals and or AC charging terminals.

The first charging component 20 includes a charging controller 30, which may be used to control vehicle charging. For example, the charging controller 30 may control power supply along the charging terminals 26. The charging controller 30 may communicate with the second charging component 40, such as to control the second charging component 40. For example, the charging controller 30 may cause the second charging component 40 to turn on the power supply, turn off the power supply, increase power supply, and/or decrease power supply.

In an exemplary embodiment, the first charging component 20 includes a temperature sensor 32 operably coupled to the charging controller 30 to monitor a temperature of the charging terminals 26. The vehicle charging may be controlled based on the temperature readings of the temperature sensor 32.

In an exemplary embodiment, the first charging component 20 includes an arc sensor 34 operably coupled to the charging controller 30 to detect an arc event within the first charging component 20, such as at the charging terminal 26. The arc sensor 34 is operably coupled to the charging controller 30 to control the vehicle charging when the arc event is detected. For example, when the arc event is detected, the charging controller immediately shuts off the power supply to stop the charging process and extinguish the arc.

The second charging component 40 includes a housing 44 holding a plurality of charging terminals 46. The charging terminals 46 are configured to be mated with the charging terminals 26. In various embodiments, the charging terminals 46 are socket terminals and the charging terminals 26 are pin terminals; however, other types of terminals may be used in alternative embodiments. The charging terminals 46 may be DC charging terminals and or AC charging terminals.

The second charging component 40 includes a charging controller 50, which may be used to control vehicle charging. For example, the charging controller 50 may control power supply along the charging terminals 46. The charging controller 50 may communicate with the first charging component 20. The charging controller 50 may turn on the power supply, turn off the power supply, increase the power supply, and/or decrease the power supply. The charging controller 50 may control the voltage and/or current supplied by the second charging component 40.

In an exemplary embodiment, the second charging component 40 includes a temperature sensor 52 operably coupled to the charging controller 50 to monitor a temperature of the charging terminals 46. The vehicle charging may be controlled based on the temperature readings of the temperature sensor 52.

In an exemplary embodiment, the second charging component 40 includes an arc sensor 54 operably coupled to the charging controller 50 to detect an arc event at the mating interface, such as at the charging terminal 46. The arc sensor 54 is operably coupled to the charging controller 50 to control the vehicle charging when the arc event is detected. For example, when the arc event is detected, the charging controller immediately shuts off the power supply to stop the charging process and extinguish the arc.

Figure 2:
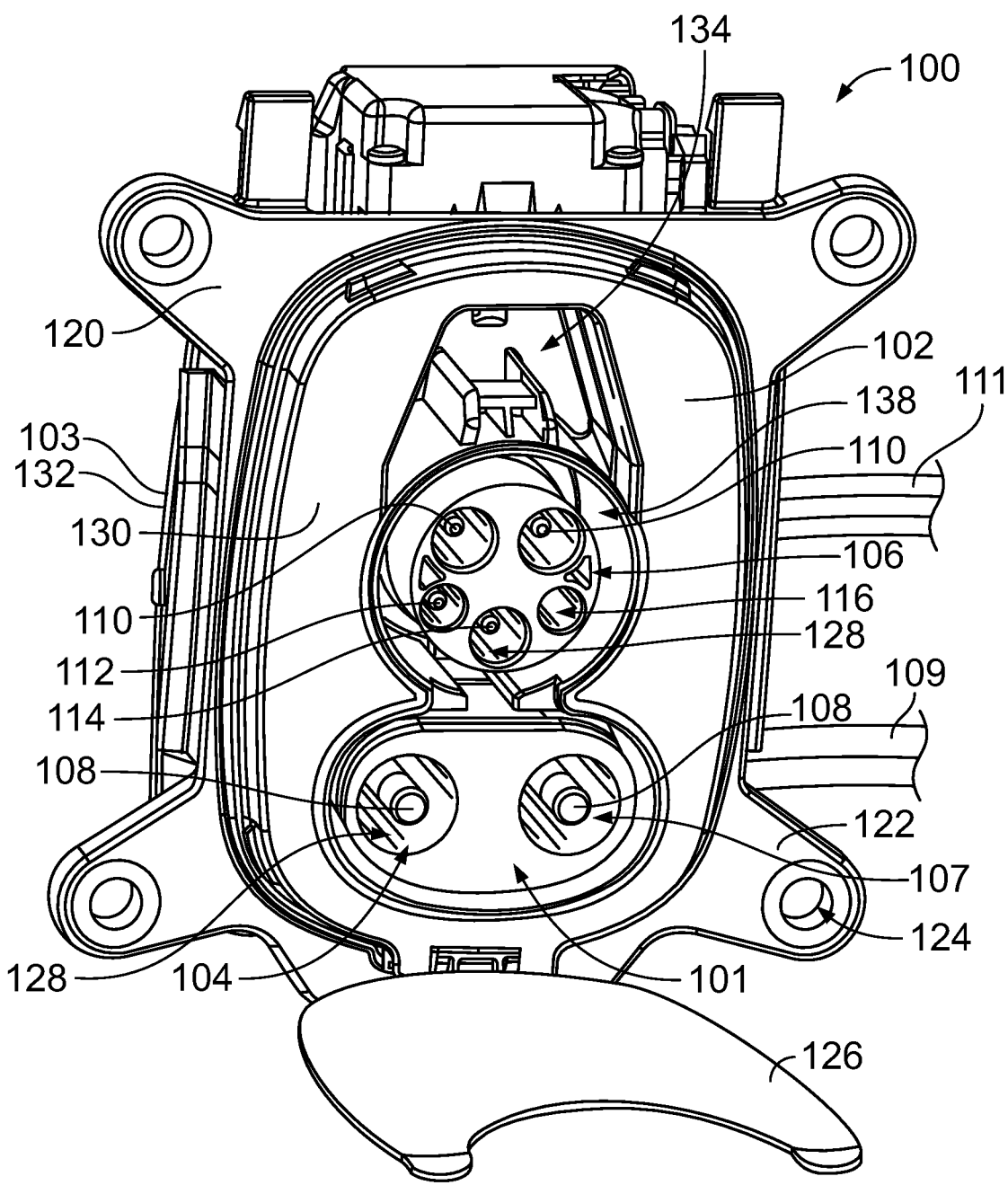
FIG. 2 is a front perspective view of a charging component in accordance with an exemplary embodiment.
Figure 3:
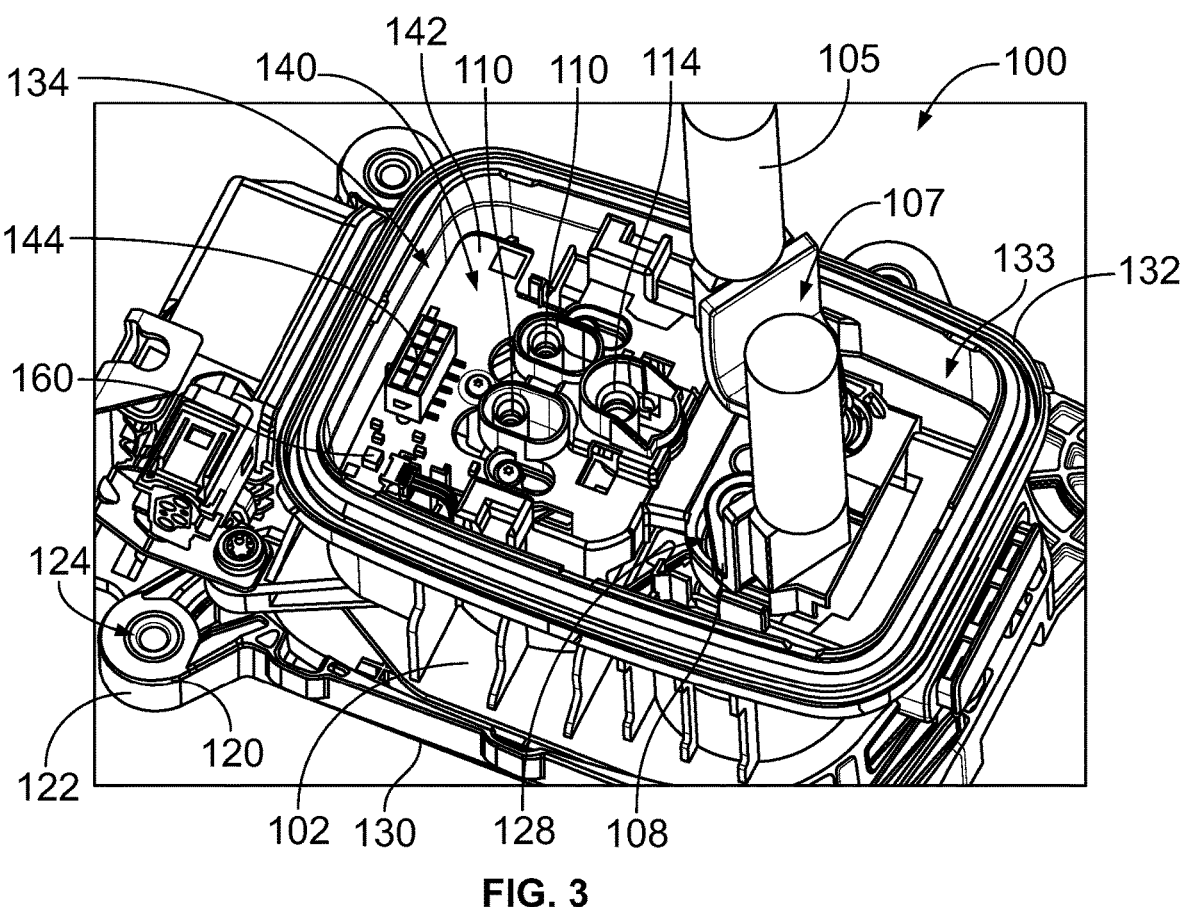
FIG. 3 is a rear perspective view of the charging component in accordance with an exemplary embodiment.

FIG. 2 is a front perspective view of a charging component 100 in accordance with an exemplary embodiment. FIG. 3 is a rear perspective view of the charging component 100 in accordance with an exemplary embodiment. In the illustrated embodiment, the charging component 100 is a charging inlet assembly and may be referred to hereinafter as a charging inlet assembly 100. The charging inlet assembly 100 is configured to be mated with a complimentary charging component (not shown), such as a charging connector or plug charger.

The charging inlet assembly 100 defines a power connector 101 configured to be electrically connected to the charging connector for charging a battery system of a vehicle, such as an electric vehicle (EV) or hybrid electric vehicle (HEV). In an exemplary embodiment, the charging inlet assembly 100 is configured for mating with a DC fast charging connector, such as the SAE combo CCS charging connector, in addition to AC charging connectors, such as the SAE J1772 charging connector. In various embodiments, the charging inlet assembly 100 has a CCS1 (5 pin) AC configuration. In other various embodiments, the charging inlet assembly 100 may have a CCS2 (7 pin) AC configuration. Other standard inlet configurations may be used in alternative embodiments.

The charging inlet assembly 100 includes a housing 102 configured to be mounted in the vehicle. The housing 102 forms a portion of the power connector 101 for mating with the charging connector. A rear cover 103 (shown in FIG. 2 but removed in FIG. 3 to illustrate components of the charging inlet assembly 100) is coupled to a rear of the housing 102 to close out the housing 102 and the internal components of the charging inlet assembly 100. The rear cover 103 may be sealed to the housing 102 to prevent moisture and debris from entering the internal compartment of the housing 102. In an exemplary embodiment, the power connector 101 defines a DC charging portion 104 and an AC charging portion 106. The charging portions 104, 106 may form receptacles or openings that receive a plug of the charging connector. The charging inlet assembly 100 includes a plurality of charging terminals 107 for connection to the charging connector. Power cables 105 are electrically connected to the charging terminals 107 and routed within the vehicle, such as to the battery.

The DC charging portion 104 is configured for mating with an DC charging connector or an DC section of the charging connector. The DC charging portion may be used for fast charging. In an exemplary embodiment, the charging terminals 107 of the charging inlet assembly 100 includes DC charging terminals 108 at the DC charging portion 104, such as a pair of the DC charging terminals 108. The DC charging terminals 108 are configured to be electrically connected to the DC charging connector. The charging inlet assembly 100 includes DC power cables 109 (FIG. 2) electrically connected to the DC charging terminals 108. The DC power cables 109 may be terminated directly to the DC charging terminals 108, such as being crimped or welded to the DC charging terminals 108. In other embodiments, the DC power cables 109 may be electrically connected to the DC charging terminals 108 through a separable interface, such as through connectors mated to the housing 102 at the rear.

The AC charging portion 106 is configured for mating with an AC charging connector or an AC section of the charging connector. In an exemplary embodiment, the charging terminals 107 of the charging inlet assembly 100 includes AC power terminals 110 at the AC charging portion 106, such as a pair of the AC power terminals 110. The charging terminals 107 of the charging inlet assembly 100 include a proximity terminal 112 at the AC charging portion 106. The charging terminals 107 of the charging inlet assembly 100 include a ground terminal 114 at the AC charging portion 106. The charging terminals 107 of the charging inlet assembly 100 include a communication terminal 116 at the AC charging portion 106. The AC power terminals 110, the proximity terminal 112, the ground terminal 114, and the communication terminal 116 are configured to be electrically connected to the AC charging connector.

The charging inlet assembly 100 includes AC cables 111 (FIG. 2) electrically connected to the corresponding AC terminals 110, 112, 114, 116. The AC cables 111 may be terminated directly to the AC terminals 110, 112, 114, 116, such as being crimped or welded thereto. In other embodiments, the AC cables 111 may be electrically connected to the AC terminals 110, 112, 114, 116 through a separable interface, such as through connectors mated to the housing 102 at the rear.

The cables 109, 111 extend from the charging inlet assembly 100 to another component of the vehicle, such as the battery system of the vehicle. The cables 109, 111 transmit power, such as to the battery of the vehicle. The DC power cables 109 may transmit high voltage for charging the battery and the AC cables 111 may transmit low voltage for charging the battery. Optionally, one or more of the cables 111 may be electrically connected to a battery control unit (not shown) of the battery system, such as to transmit data between the charging inlet assembly 100 and the battery system, such as data relating to the charging operation. For example, the cable 111 may transmit data relating to charging start/stop, operating temperature of the power terminals 108 and/or 110, or other charging data. The cable 111 may send a proximity signal to the battery system indicating when the charging device is mated to the power connector 101 of the charging inlet assembly 100.

The charging inlet assembly 100 includes a mounting flange 120 (FIG. 1) coupled to the housing 102. The mounting flange 120 is used to couple the charging inlet assembly 100 to the vehicle. The mounting flange 120 includes mounting tabs 122 having openings 124 that receive fasteners (not shown) used to secure the charging inlet assembly 100 to the vehicle. Other types of mounting features may be used to secure the charging inlet assembly 100 to the vehicle. The mounting flange 120 may include a seal to seal the charging inlet assembly 100 to the vehicle.

In an exemplary embodiment, the charging inlet assembly 100 includes a terminal cover 126 (FIG. 2) at a front 130 of the housing 102. The terminal cover 126 is hingedly coupled to the mounting flange 120 and/or the housing 102. The terminal cover 126 is used to cover portions of the housing 102, such as the power connector 101. The terminal cover 126 may be used to cover the DC charging terminals 108 and/or the AC power terminals 110, which are located in corresponding terminal channels 128 in the housing 102.

The rear cover 103 is provided at a rear 132 of the housing 102 to close access to a rear chamber 133 at the rear 132 of the housing 102. The rear cover 103 may be clipped or latched onto the main part of the housing 102, such as using clips or latches. Other types of securing features, such as fasteners may be used in alternative embodiments. A perimeter seal may be provided between the rear cover 103 and the housing 102.

In an exemplary embodiment, the housing 102 of the charging inlet assembly 100 includes an internal cavity 134 that receives the components of the charging inlet assembly 100. The rear chamber 133 is at the rear of the internal cavity 134. The internal cavity 134 includes the terminal channels 128 that receive the corresponding charging terminals 107. The internal cavity 134 includes a front chamber 138 at the front that receive the charging connector.

In an exemplary embodiment, the charging inlet assembly 100 includes a charging controller 140 for controlling charging of the vehicle through the charging inlet assembly 100. The charging controller 140 is received in the internal cavity 134, such as in the rear chamber 133. The charging controller 140 may be communicatively coupled to the other charging component, such as the charging connector or plug, to control the charging activity. For example, the charging controller 140 may be communicatively coupled to the charging connector through one or more of the terminals 107. The charging controller 140 may turn on the power supply, turn off the power supply, increase the power supply, and/or decrease the power supply.

Figure 4:
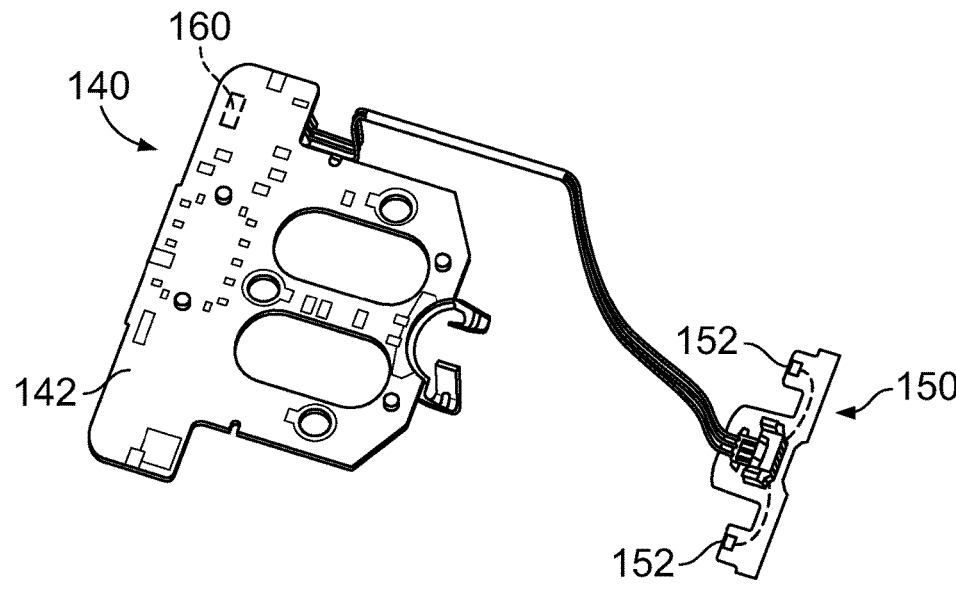
FIG. 4 is a perspective view of the charging controller in accordance with an exemplary embodiment.

With additional reference to FIG. 4, which is a perspective view of the charging controller 140 in accordance with an exemplary embodiment, the charging controller 140 includes a circuit board 142, a control device 144, and other various components and circuitry to control operation of the charging inlet assembly 100. The control device 144 may be a processor or microcontroller. The control device 144 may include a multi-pin connector coupled to the circuit board 142.

In an exemplary embodiment, the control assembly includes one or more sensors 150 used to control the charging operation. The sensors 150 are used to sense operating characteristics of the components or the charging process to control charging. The sensors 150 are connected to the charging controller 140, such as being connected to the circuit board 142 by a wire or connector.

In various embodiments, the sensors 150 include temperature sensors 152. The temperature sensors 152 monitor operating temperatures of the DC charging terminals 108. The charging operation may be controlled based on the operating temperatures of the DC charging terminals 108. For example, as the temperature increases or approaches an allowable operating temperature, the power supply may be decreased. For example, the voltage or current may be reduced. The charging operation may stop if the operating temperature of the DC charging terminals 108 is above a threshold temperature.

In various embodiments, the sensors 150 include arc sensors 160. The arc sensors 160 detect an arc event within the charging inlet assembly 100, such as at mating ends of the DC charging terminals 108. The charging operation may be controlled based on the detection of the arc event. For example, when the arc event is detected, the charging operation is stopped. The current and voltage from the charging connector is stopped immediately to prevent damage to the components or the vehicle.

Figure 5:
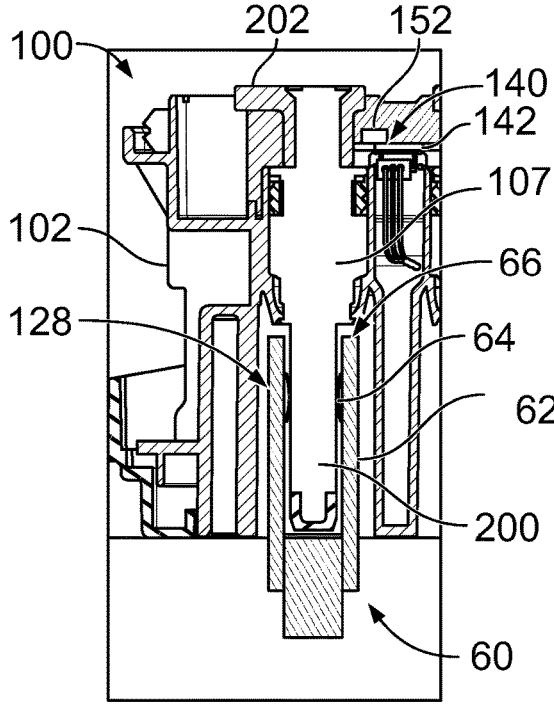
FIG. 5 is a cross sectional view of the charging component in accordance with an exemplary embodiment showing a second charging component coupled to the charging component.
Figure 6:
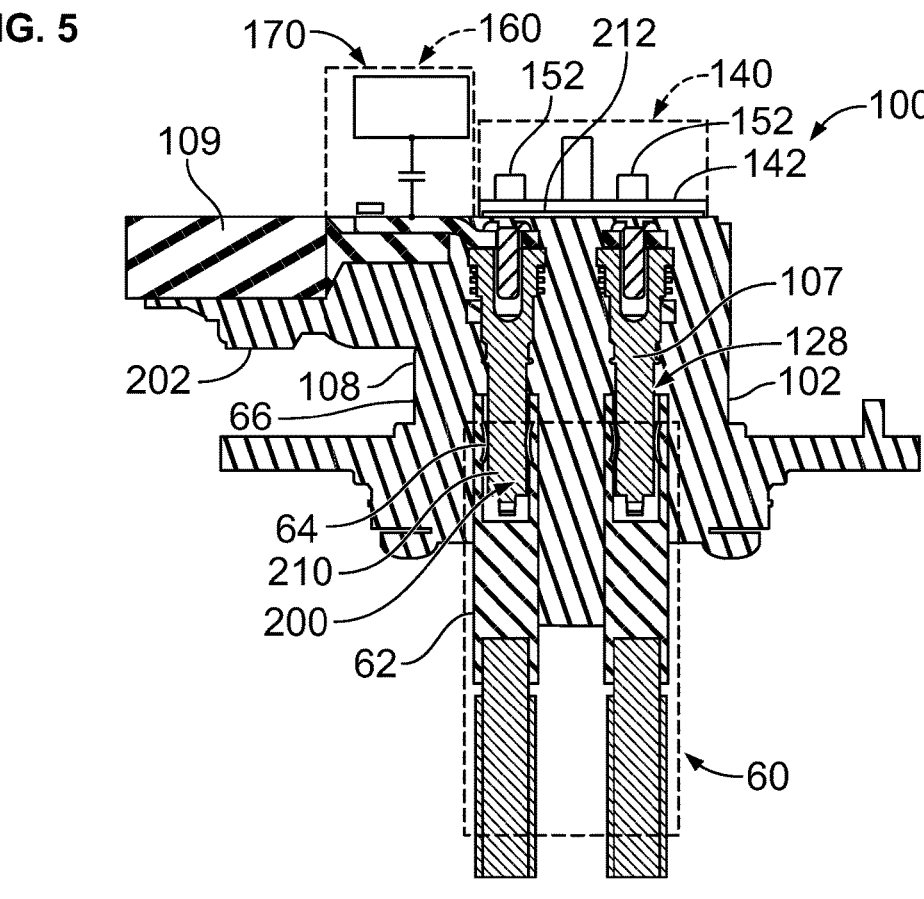
FIG. 6 is a cross sectional view of the charging component in accordance with an exemplary embodiment showing the second charging component coupled to the charging component.

FIG. 5 is a cross sectional view of the charging component 100 in accordance with an exemplary embodiment showing a second charging component 60 coupled to the charging component. FIG. 6 is a cross sectional view of the charging component 100 in accordance with an exemplary embodiment showing the second charging component 60 coupled to the charging component. In the illustrated embodiment, the charging component 100 is the charging inlet assembly. The second charging component 60 is a charging connector such as a plug charger.

The charging terminals 107 are shown in the terminal channels 128 of the housing 102. The charging terminals 107 are mated with charging terminals 62 of the charging connector 60. In the illustrated embodiment, the charging terminals 107 are pin terminals and the charging terminals 62 are socket terminals having spring contacts 64 in the sockets configured to electrically connect the charging terminals 62 and the charging terminals 107. The spring contacts 64 form a compliant, separable interface. The spring contacts 64 may be susceptible to failure due to overheating, and the failure may lead to an electrical arc event. The temperature sensors 152 monitor temperature of the charging terminals 107. The arc sensors 160 monitor the mating zone for arc events, such as at mating ends 66 of the charging terminals 62 or mating ends of the charging terminals 107.

The charging terminal 107 includes a mating pin 200 at a mating end 210 of the charging terminal 107 and a cable connector 202 at a rear 212 of the charging terminal 107. The charging terminal 107 extends along a longitudinal axis. The mating pin 200 is configured to be mated to the spring contact 64 of the charging terminal 62 of the charging connector 60. The cable connector 202 is configured to be electrically connected to the power cable 109. In various embodiments, the cable connector 202 is configured to be terminated to the power cable 109 by crimping to the power cable 109. In other various embodiments, the cable connector 202 is terminated to the power cable 109 by other processes, such as being welded to a weld tab at the rear end of the charging terminal 107. The cable 109 may extend from the charging terminal 107 perpendicular to the longitudinal axis. Alternatively, the cable 109 may extend from the charging terminal 107 parallel to the longitudinal axis.

In an exemplary embodiment, the temperature sensor 152 is coupled to the charging terminal 107 at the rear of the charging terminal 107, such as at the cable connector 202. The charging terminal 107 is both electrically conductive and thermally conductive. As the mating pin 200 heats up during charging, the entire body of the charging terminal 107 similarly heats up. Such increase in temperature is detected by the temperature sensor 152. In various embodiments, the temperature sensor 152 is a thermistor. The temperature sensor 152 may include a resistance temperature detector.

The arc sensor 160 detects an arc event within the charging inlet assembly 100, such as at the mating ends 210. In various embodiments, the arc sensor 160 monitors for an arc noise signature on an electrical circuit to detect the arc event. For example, noise is induced into the nearby electrical circuit as a consequence of arc energy inductively coupling from the charging terminal 107 and/or power cable 109 into the nearby electrical circuit. The characteristic noise signature of the electrical arcing may be between 100-500 kHz. The arc sensor 160 detects the 100-500 kHz stochastic energy, or noise signature, generated by the electrical arc. In other various embodiments, the arc sensor 160 monitors for an arc UV light signature to detect the arc event.

In an exemplary embodiment, the arc sensor 160 includes an arc noise signature monitor 170 monitoring an electrical circuit of the charging inlet assembly 100 to detect an arc noise signature on the electrical circuit corresponding to the arc event. The electrical circuit may be the power circuit, such as along the charging terminals 107 and/or the power cables 109. The electrical circuit may be a circuit of the charging controller 140, such as a circuit on the circuit board 142 (FIG. 3). The arc noise signature monitor 170 may monitor a spectrogram of a signal on the electrical circuit to detect the arc noise signature. The arc noise signature monitor 170 may monitor for a rise in amplitude on the electrical circuit indicative of arcing.

Electrical conduction in an arc is a stochastic process that generates a characteristic noise signature, such as between 100-500 kHz. In contrast, the charging system tends to generate a chopped or commutated current waveform at about 200 kHz. The arc noise signature can be readily distinguished by the arc noise signature monitor 170 from the charging current signature within the electrical circuit by methods such as examining the Fourier Transform or spectrogram of the signal on the electrical circuit associated with the charging current. In various embodiments, the arc noise signature may be detected by identifying a sudden rise in amplitude over the 100-500 kHz range, which would indicate the onset of arcing.

In various embodiments, the charging controller 140 may include an arc fault circuit interrupter (AFCI) device to protect against electrical arcing, such as to shut down the charging circuit when an arc is detected. The arc noise signature monitor 170 monitors the electrical circuit to detect the arc noise signature conducted on the electrical circuit when the arc fault occurs. The charging controller 140 may include an internal processor in the ACFI device that distinguishes between normal operation and the hazardous arcing and will automatically open the circuit to reduce the risk of damage to the system.

In various embodiments, the arc sensor 160 is connected to other wiring or circuits to detect the arc noise signature. In other various embodiments, the arc sensor 160 includes a separate, dedicated arc detection wire, which may be routed from the charging terminal 107 to the circuit board 142 or routed to another component, such as the battery control module. The arc sensor 160 may include a resistor-capacitor-inductor network at the charging terminal 107 or at the circuit board 142 to enhance sensitivity to arc signature and minimize sensitivity to normal vehicle electrical noise.

In an exemplary embodiment, the arc noise signature monitor 170 is electrically coupled to the electrical circuit at or near the cable connector 202 at the rear 212 of the charging terminal 107. The arc noise signature monitor 170 may be coupled to the cable connector 202 or to the cable 109. In various embodiments, the arc noise signature monitor 170 includes a current transformer around the power cable 109 to monitor the electrical signature along the cable 109. In other various embodiments, the arc noise signature monitor 170 includes a Hall sensor adjacent to the cable 109 or the cable connector 202 to monitor the electrical signature along the electrical circuit. In various embodiments, the arc noise signature monitor 170 includes an induction coil to monitor the electrical signature along the electrical circuit. The induction coil may be positioned at or near the cable connector 202 or the cable 109. The induction coil may be provided on a circuit board, such as the circuit board 142 or another circuit board, such as a circuit board for the temperature sensor system. In various embodiments, the induction coil is broadly tuned with a capacitor. The arc noise signature monitor 170 may include isolation from the power circuit, such as from the conductors of the cable 109 or the cable connector 202 to prevent damage to the arc noise signature monitor 170. For example, the current transformers, the hall sensor and/or the induction coil may have electrical isolation from the conductors carrying charging current. Electrical isolation may be provided by suitable DC blocking capacitors to isolate the components from the charging current conductors.

Figure 7:
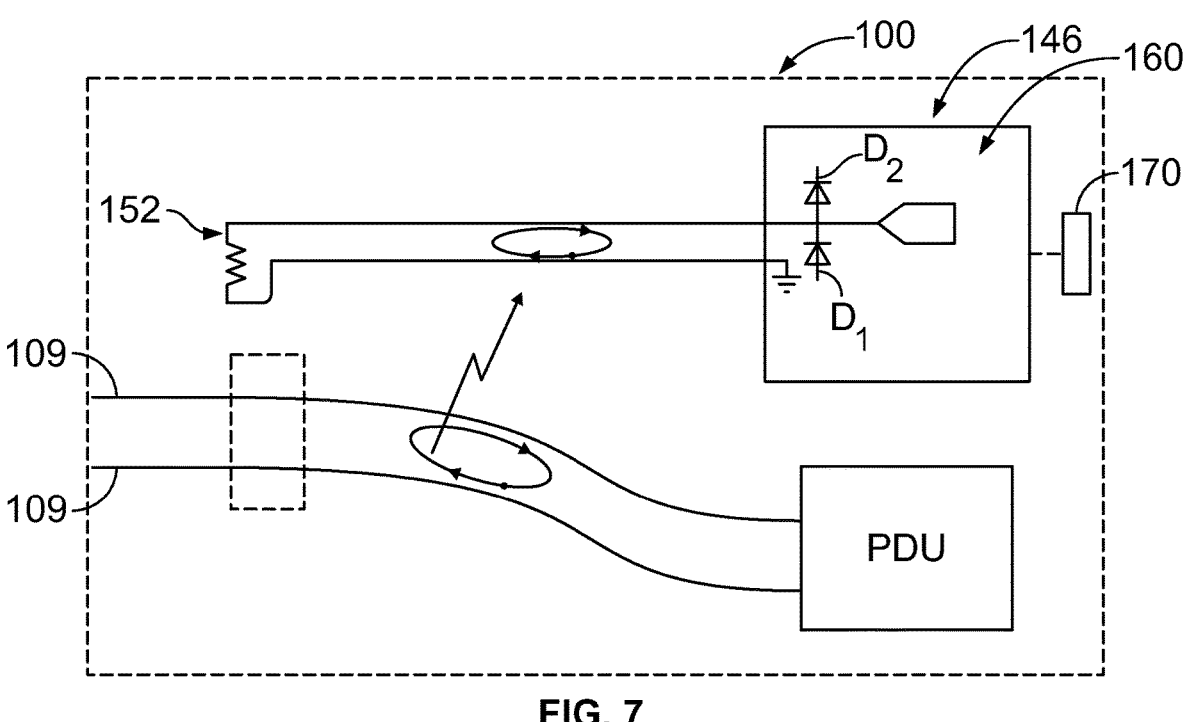
FIG. 7 is a schematic view of the charging component in accordance with an exemplary embodiment.

FIG. 7 is a schematic view of the charging component 100 in accordance with an exemplary embodiment. The charging component 100 includes the temperature sensors 152 and the arc sensor 160 for monitoring the charging operation and controlling the charging, such as to shut off charging if the allowable charging temperature is exceeded or if an electrical arc event is detected. In an exemplary embodiment, the arc sensor 160 is coupled to the temperature sensors 152. For example, the temperature sensing electrical circuit for the temperature sensors 152 is monitored by the arc sensor 160 to detect for the electrical arc event. As such, additional sensors or circuits may be avoided, which may reduce cost and components. The arc noise signature monitor 170 monitors signals transmitted between the temperature sensor 152 and the charging controller 140 to detect an arc noise signature within the signals indicative of arcing.

In an exemplary embodiment, the arc sensor 160 monitors the temperature sensing circuit for the arc noise signature to detect the arc event. For example, the noise induced into the temperature electrical circuit as a consequence of the arc energy may be detected by the arc sensor 160. The arc noise signature monitor 170 may be coupled to the temperature sensing circuit to detect the arc noise signature on the electrical circuit corresponding to the arc event. The arc noise signature monitor 170 may monitor a spectrogram of a signal on the electrical circuit to detect the arc noise signature. The arc noise signature monitor 170 may monitor for a rise in amplitude on the electrical circuit indicative of arcing. In various embodiments, the arc noise signature monitor 170 may include an induction coil at the temperature sensing circuit, which may be broadly tuned with a capacitor.

During the arc event, electrical noise from the terminal arcing induces noise in the adjacent thermistor conductors of the temperature sensors 152. The induced noise is rectified in a diode junction at an ADC (Analog-to-Digital Converter) used to measure thermistor resistance and that rectified noise either adds to or subtracts from the actual measured resistance value. The coupling of the arc signal from the charging conductors to the remote thermistor conductors allows use of the temperature sensing circuit for both temperature sensing and also arc sensing. In an exemplary embodiment, the arc sensor 160 includes a high-pass filter between the ADC input and a second input so that the second input responds only to the arc signature riding along the thermistor conductors. The thermistor wiring harness forms a natural antenna that picks up the MF (Medium Frequency—100 kHz-3 MHz) arc signal radiated from the DC conductors with no additional components. The detection circuitry for the arc sensor 160 may be built into the control unit with little additional parts count.

In an exemplary embodiment, the two DC conductors (for example, power cables 109 and/or terminals) and the two pair of thermistor conductors of the temperature sensors 152 each form a closed loop. Current flow in a loop produces a magnetic field normal to the loop. AC current forms an alternating magnetic field that emits an electromagnetic wave. The proximity of both loops provides a mutual coupling that conveys the noise signal from the DC loop to the thermistor loops. Each set of wires forms a closed loop. Terminal ends of the thermistor wires are the thermistor at the charging inlet and the ADC input at the ECU. Terminal ends of the charging cables are the vehicle PDU (Power Distribution Unit) and the power conditioning electronics in the charging station (not shown). Arcing at either terminal of the charging inlet induces a MF signal in the charging cable loop. The loop will then radiate an electromagnetic wave, which induces a replica of the MF signal in the thermistor cable loop. The signal is rectified and smoothed by internal clamp diodes D1 and D2 and the inherent junction capacitance then applied to the ADC along with the desired thermistor signal. The arc noise signal is added to the temperature signal at the input of the ADC and affects the resulting output value. The arc sensor 160 monitors for the arc noise signature.

Figure 8:
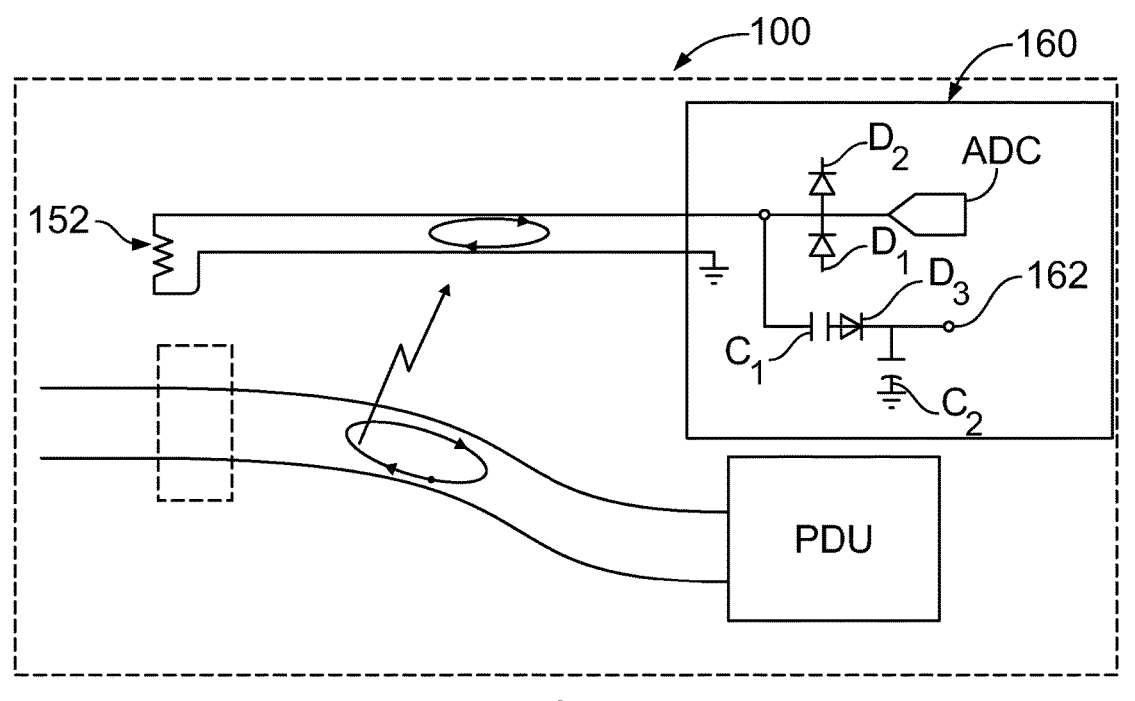
FIG. 8 is a schematic view of the charging component in accordance with an exemplary embodiment.

FIG. 8 is a schematic view of the charging component 100 in accordance with an exemplary embodiment. The charging component 100 includes the temperature sensors 152 and the arc sensor 160 for monitoring the charging operation and controlling the charging, such as to shut off charging if the allowable charging temperature is exceeded or if an electrical arc event is detected. In the illustrated embodiment, the charging component 100 has an alternative ECU input circuit. The thermistor is routed to the ADC and is subject to EMI from an arc. A portion of the signal is routed through capacitor C1 then applied to the envelope detector D3 and C2. The rectified and smoothed output appears at an arc signal output 164 of the arc sensor 160 and is used to signal when an arc is detected. C1 blocks DC and passes the MF arc signal. Other electrical components may be used to improve spectral selectivity and avoid potential false positive events.

Figure 9:
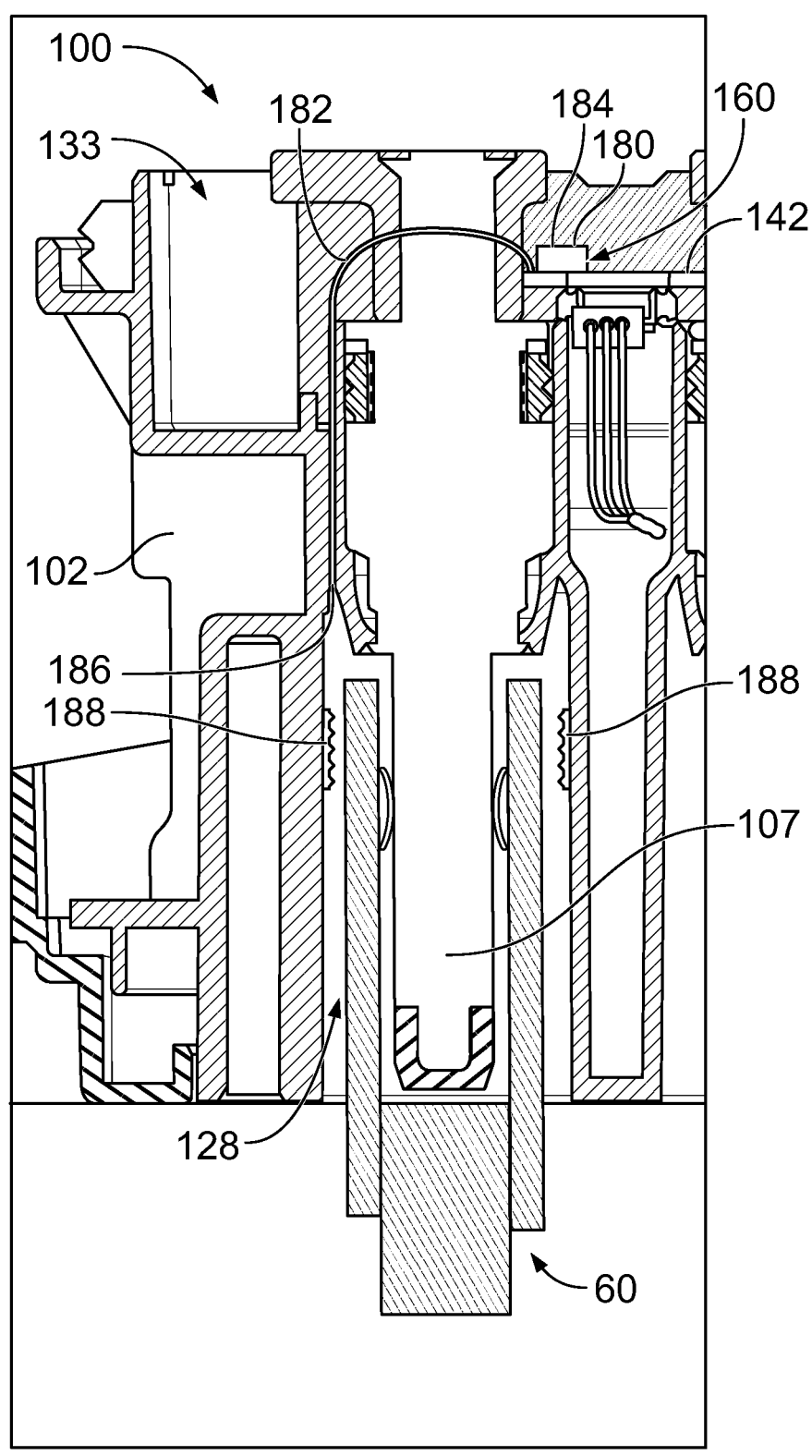
FIG. 9 is a cross sectional view of the charging component in accordance with an exemplary embodiment showing the second charging component coupled to the charging component.

FIG. 9 is a cross sectional view of the charging component 100 in accordance with an exemplary embodiment showing the second charging component 60 coupled to the charging component 100. The charging component 100 includes the arc sensor 160 for monitoring the charging operation and controlling the charging, such as to shut off charging if an electrical arc event is detected.

In an exemplary embodiment, the arc sensor 160 includes a light detector 180 to detect light from an arc event. For example, the light detector 180 is a UV light detector configured to monitor for an arc UV light signature. Energy at the correct wavelength and frequency at the light detector 180 signifies arcing and provides a signal to cause the charging operation to stop. The light detector 180 may be a photodiode. In an exemplary embodiment, the light detector 180 is located in the rear chamber 133. The light detector 180 may be part of a control circuit, such as being mounted to a circuit board or connected to the circuit board 142 by a wire. The light detector 180 is configured to detect light in the terminal channel 128, such as at or near the mating end of the charging terminal 107. In an exemplary embodiment, a light guide 182 extends between the terminal channel 128 and the light detector 180. The light guide 182 may be an optical fiber. The light guide 182 extends between a first end 184 and a second end 186. The first end 184 is coupled to the light detector 180. The second end 186 is positioned proximate to the mating end of the charging terminal 107. Light from the arc event is transmitted from the second end 186 to the first end 184 for detection by the light detector 180. In an exemplary embodiment, a UV sensitive coating 188 may be applied on the housing 102 proximate to the mating end of the charging terminal 107, such as within the terminal channel 128. The UV sensitive coating 188 is activated during the arc event to increase the light produced during the arc event for quicker and or more reliable monitoring by the light detector 180.

Arcing at the mating interface happens in air. When brought to an excited state by an arc the nitrogen and oxygen in the air emit light. The two strongest emission lines for oxygen are at 430 nm and 538 nm, which are near-UV and deep blue, respectively. Since light is not normally present inside the mated connector, light output detected by the light detector 180 would indicate onset of arcing. The light detector 180 may detect light that leaks through small gaps in the mated connector or light that has been routed from the terminal region to the sensor by the light guide 182. The light guide 182 brings may be routed through the housing 102 without compromising the electrical insulative properties of the housing 102. Detection of leaked light could be enhanced by coating the interior connector walls with a UV-sensitive phosphor that more effectively spreads light to the light detector 180.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A vehicle charging system for an electric vehicle comprising:
   a housing having a mating end for mating with a charging component for the electric vehicle, the housing including an internal cavity;
   an DC charging terminal held by the housing in the internal cavity, the DC charging terminal including a mating end for mating with the charging component, the DC charging terminal being connected to a power cable;
   a charging controller for controlling vehicle charging along the DC charging terminal; and
   an arc sensor in the internal cavity configured to detect an arc event at the mating end of the DC charging terminal, the arc sensor being operably coupled to the charging controller to control the vehicle charging when the arc event is detected.

2. The vehicle charging system of claim 1, wherein the charging controller shuts power supplied to the DC charging terminal when the arc event is detected.

3. The vehicle charging system of claim 1, wherein the housing is a charging connector housing configured to be removably coupled to a charging inlet housing of the charging component of the vehicle, the DC charging terminal being a socket terminal configured to be mated with a pin terminal of the charging component to power the vehicle through the pin terminal.

4. The vehicle charging system of claim 1, wherein the housing is a charging inlet housing configured to be mounted to the vehicle and configured to receive a charging connector housing of the charging component, the DC charging terminal including a pin configured to be mated with a socket terminal of the charging component to receive power from the charging component.

5. The vehicle charging system of claim 1, further comprising a temperature sensor monitoring temperature of the DC charging terminal, the temperature sensor being operably coupled to the charging controller to control the vehicle charging based on the temperature of the DC charging terminal.

6. The vehicle charging system of claim 5, wherein the arc sensor includes an arc noise signature monitor monitoring signals transmitted between the temperature sensor and the charging controller to detect an arc noise signature within the signals indicative of arcing.

7. The vehicle charging system of claim 1, wherein the arc sensor includes an arc noise signature monitor monitoring an electrical circuit to detect an arc noise signature on the electrical circuit corresponding to the arc event.

8. The vehicle charging system of claim 7, wherein the arc noise signature monitor includes a current transformer operably coupled to the power cable to monitor the arc noise signature on the power cable.

9. The vehicle charging system of claim 7, wherein the arc noise signature monitor includes a hall sensor operably coupled to the power cable to monitor the arc noise signature on the power cable.

10. The vehicle charging system of claim 7, wherein the arc noise signature monitor includes an induction coil and a capacitor coupled to the electrical circuit.

11. The vehicle charging system of claim 7, wherein the arc noise signature monitor monitors a spectrogram of a signal on the electrical circuit.

12. The vehicle charging system of claim 7, wherein the arc noise signature monitor monitors for a rise in amplitude on the electrical circuit indicative of arcing.

13. The vehicle charging system of claim 1, wherein the arc sensor includes a light detector configured to detect light from the arc event.

14. The vehicle charging system of claim 13, further comprising a light guide extending between a first end and a second end, the first end being coupled to the light detector, the second end being positioned proximate to the mating end of the DC charging terminal.

15. The vehicle charging system of claim 13, further comprising a UV sensitive coating on the housing proximate to the mating end of the DC charging terminal activated during the arc event.

16. A vehicle charging system for an electric vehicle comprising:
   a housing having a mating end for mating with a charging component for the electric vehicle, the housing including an internal cavity;
   DC charging terminals coupled to the housing, each of the DC charging terminals including a mating end and a terminating end opposite the mating end, the mating end for mating with the charging component, the terminating end being connected to a power cable;
   a charging controller for controlling vehicle charging along the DC charging terminals; and
   an arc sensor in the internal cavity configured to detect an arc event at the mating end of the DC charging terminal, the arc sensor including an arc noise signature monitor monitoring an electrical circuit to detect an arc noise signature on the electrical circuit corresponding to the arc event, the arc sensor being operably coupled to the charging controller to control the vehicle charging when the arc event is detected.

17. The vehicle charging system of claim 16, further comprising a temperature sensor monitoring temperature of the DC charging terminal, the temperature sensor being operably coupled to the charging controller to control the vehicle charging based on the temperature of the DC charging terminal, the arc noise signature monitor monitoring signals transmitted between the temperature sensor and the charging controller to detect an arc noise signature within the signals indicative of arcing.

18. A charging inlet assembly for an electric vehicle comprising:

a housing extending between a front and a rear, the housing having a chamber at the rear, the housing having a power connector at the front for receiving a charging connector, the power connector including terminal channels between the front and the rear;

DC charging terminals coupled to the housing, each of the DC charging terminals including a mating pin and a terminating end opposite the mating pin, the mating pin positioned in the corresponding terminal channel for mating with the charging connector, the terminating end positioned in the chamber at the rear of the housing;

a charging controller received in the chamber, the charging controller controlling vehicle charging along the DC charging terminals; and an arc sensor in the housing configured to detect an arc event occurring at the mating pin of the corresponding DC charging terminal, the arc sensor being operably coupled to the charging controller to control the vehicle charging when the arc event is detected.

19. The charging inlet assembly of claim 18, further comprising a temperature sensor monitoring temperature of the DC charging terminal, the temperature sensor being operably coupled to the charging controller to control the vehicle charging based on the temperature of the DC charging terminal.

20. The vehicle charging system of claim 18, wherein the arc sensor includes an arc noise signature monitor monitoring an electrical circuit to detect an arc noise signature on the electrical circuit corresponding to the arc event.

21. The vehicle charging system of claim 18, wherein the arc sensor includes a light detector configured to detect light from the arc event.

* * * * *